(12) United States Patent
Wang et al.

(10) Patent No.: US 6,363,318 B1
(45) Date of Patent: Mar. 26, 2002

(54) METHOD TO COMPENSATE ERRORS IN ENGINE SPEED MEASUREMENT

(75) Inventors: Yue Yun Wang; Mark R. Stepper, both of Columbus, IN (US)

(73) Assignee: Cummins Engine Company, Inc., Columbus, IN (US)

(*) Notice: Subject to any disclaimer, the term of this patent is extended or adjusted under 35 U.S.C. 154(b) by 0 days.

(21) Appl. No.: 09/598,212

(22) Filed: Jun. 21, 2000

(51) Int. Cl.[7] .......................... G06G 19/00; F02D 31/00
(52) U.S. Cl. ........................................ 701/110; 123/352
(58) Field of Search .............................. 123/350, 352, 123/357, 361, 406.59, 617, 339.11, 339.19, 339.2; 701/101, 102, 103, 110, 111; 73/116, 117.3

(56) References Cited

U.S. PATENT DOCUMENTS

| | | | | |
|---|---|---|---|---|
| 4,069,707 A | * | 1/1978 | Cook et al. ................. | 73/117.3 |
| 4,936,277 A | | 6/1990 | Deutsch et al. ............. | 123/436 |
| 5,278,760 A | | 1/1994 | Ribbens et al. ............. | 701/111 |
| 5,345,817 A | | 9/1994 | Grenn et al. ................ | 73/117.3 |
| 5,361,629 A | | 11/1994 | McCombie ................. | 73/117.3 |
| 5,495,835 A | * | 3/1996 | Ueda ..................... | 123/339.11 |
| 5,497,329 A | | 3/1996 | Tang .......................... | 701/104 |
| 5,515,281 A | | 5/1996 | Palazzetti et al. ........... | 701/111 |
| 5,553,589 A | | 9/1996 | Middleton et al. .......... | 123/352 |
| 5,576,963 A | | 11/1996 | Ribbens et al. ............. | 701/111 |
| 5,631,411 A | | 5/1997 | Harms et al. ............... | 73/117.3 |
| 5,696,316 A | | 12/1997 | Mezger et al. ................ | 73/116 |
| 5,699,253 A | | 12/1997 | Puskorius et al. .......... | 701/111 |

* cited by examiner

Primary Examiner—Willis R. Wolfe
(74) Attorney, Agent, or Firm—Woodard, Emhardt, Naughton, Moriarty & McNett

(57) ABSTRACT

The invention provides a software method to correct for non-fuel injection induced errors in measured engine speed. This invention provides a means to calculate a least squares regression of the measured engine speed data when the engine is motoring without combustion or load. The motoring test is to avoid the effect of unbalanced cylinder power, thus detecting only the static errors in engine speed measurements. Recognizing that the average cylinder speed should form a straight line within an engine cycle, the lease squares regression of the measured speed data therefore represents the theoretical performance of the engine. A residual between this theoretical performance and the actual measured engine speed can therefore be determined. A table of mean residuals which are averages of individual residuals measured in consecutive engine cycles is constructed for each engine at a reference engine speed. The mean residuals are convertible to other operating speed ranges of the engine and can be subtracted from the engine speed measurements to remove the static errors. This mean residual table is stored as a look-up table in the memory associated with the engine control module (ECM) microprocessor and can be implemented within the software code being executed by the ECM microprocessor.

41 Claims, 6 Drawing Sheets

METHOD TO COMPENSATE ERRORS IN ENGINE SPEED MEASUREMENT

BACKGROUND OF THE INVENTION

This invention relates in general to engine control systems, and more particularly, to a method and system for correcting static error in engine speed measurements. Static errors are fluctuations in engine speed that result from mechanical part and installation tolerances, etc., and are not directly related to engine imbalances due to fuel injections.

In a multi-cylinder reciprocating internal combustion engine, there are differences in the amount of useful torque produced by each cylinder, even during normal operation. Small between-cylinder torque differences can cause rough idling and poor emissions performance. Large between-cylinder torque differences can cause extremely rough operation and may indicate faulty cylinder and/or fuel injection components. Many inventions have been devoted to sensing these torque differences and using the information for compensation or diagnosis of engine operation.

Non-uniform cylinder torque can be observed as small engine speed fluctuations about the average engine speed at any given operating point of the engine. There are many engine systems that utilize the observed engine speed fluctuation in an engine cycle to balance the power output of the cylinders. Most present day electronically controlled engines include some form of interrupt-based engine speed sensing mechanism, which allows measurement of engine speed at very short intervals. However, the accuracy of engine speed measurement is always limited by manufacturing tolerances in the involved engine parts. These irregularities include, for example, tooth-to-tooth spacing errors in cam or crankshaft gears, and gear installation stack-up errors, and other engine components and assembly tolerances, etc. The combined effect of these irregularities is the so-called static errors in measured engine speed. The static errors can sometimes be significant; but due to the prohibitive cost of machining and installing precision gears, these errors are commonly ignored and assumed to be constant from shot to shot. Therefore, the effect of balancing cylinder power output based on the uncompensated engine speed data can be seriously compromised.

Various prior art inventions seek to compensate for the static errors in measured engine speed data. U.S. Pat. No. 5,696,316 to Mezger, et al., discloses a system for compensating errors in measuring the length of segments defined between teeth of a speed signal transmitter wheel. The Mezger, et al., system provides such compensation by "learning" the segment lengths within a predetermined engine speed range, adaptively determining correction values therefor, and applying such correction values for all subsequently measured engine speeds. However, the "learning" process is elaborate, involving multiple speed ranges. Furthermore, the system involves a device in addition to a normal engine system. U.S. Pat. No. 5,345,817 to Grenn, et al., discloses a speed signal correction system wherein the effects of tooth-to-tooth spacing errors are avoided by using common points on the crank tone wheel rather than comparing neighboring points on the wheel. Grenn's system is designed for the detection of strong engine disturbances which affect engine speed for more than one cylinder cycle; minor fluctuations within one engine cycle are filtered out.

Therefore, there is a need for a method and a system which are straightforward and inexpensive for removing static errors from engine speed data, such that the resultant engine speed data better reflect the true speed of the engine. In addition, this method or system has to be applicable over the operation speed range of the engine.

SUMMARY OF THE INVENTION

This invention calculates a least squares regression of engine speed data measured at specific target distances when the engine is in motoring deceleration without combustion or load. Recognizing that the average cylinder speed should form a straight line within an engine cycle, the least squares regression of the measured speed data therefore represents the theoretical performance of the engine. Deviations from this theoretical performance are grouped together as static errors. A residual or delta between the average cylinder speed (represented by the linear regression line) and the actual measured engine speed can therefore be determined. This delta error versus crank angle can later be subtracted from the engine speed measurements to remove the static errors.

In one form of the invention, a method for correcting static errors in measured engine speed is disclosed, comprising the steps of: a) sensing a speed of said engine a plurality of times during a time period; b) performing a least square regression analysis upon said sensed engine speeds, thereby determining a theoretical engine speed line; c) subtracting said engine speed from said theoretical speed to determine a residual at each speed measuring point; d) measuring an instantaneous engine speed; and, e) subtracting said residual from said measured engine speed, thereby resulting in a compensated engine speed which is a closer estimate of the theoretical speed of said engine.

In another form of the invention, a method for compensating measured engine speeds for non-fuel induced imbalances in a multi-cylinder reciprocating internal combustion engine is disclosed, comprising: a) sensing signals as targets pass by for a time period; b) measuring a speed at a plurality of speed points, wherein said speed points each span a plurality of consecutive targets; c) grouping said speed points, wherein each group defines a pattern of targets in one crankshaft revolution; d) averaging said speed measured, for each said speed points, over all speed point groups; e) performing a least squares regression analysis upon said average measured engine speed, thereby determining a theoretical engine speed line; f) determining a residual at each speed measuring point; g) measuring an instantaneous engine speed; and, h) subtracting said residual from said instantaneous engine speed, thereby resulting in a compensated engine speed which is a closer estimate of a true speed of said engine.

In yet another form of the invention, a system for compensating measured engine speeds for non-fuel induced imbalances in a multi-cylinder reciprocating internal combustion engine is disclosed, comprising: means for sensing a speed of said engine a plurality of times during a time period; means for performing a least squares regression analysis upon said sensed engine speeds, thereby determining a theoretical engine speed line; means for determining a residual at each speed measuring point; means for measuring an instantaneous engine speed; and means for subtracting said residual from said measured instantaneous engine speed, thereby resulting in a compensated engine speed which is a closer estimate of said theoretical speed of said engine.

In a further form of the invention, a system for compensating measured engine speeds for static errors is disclosed, comprising: means for sensing a target during a rotation of the crankshaft; means for computing a measured engine speeds at a plurality of speed points; means for performing a linear regression upon said measured engine speeds, thereby producing a mathematical representation of an average speed of said engine regardless of the firing of said at least one cylinder; means for computing a residual; means to measure an instantaneous engine speed; and means to calculate compensated measured speeds using said residuals, such that said compensated measured speeds better approximate a true speed of said engine.

A principal object of the present invention is to provide a software method and system to compensate for non-fuel injection induced errors (static errors), such as those caused by mechanical parts and installation tolerances, in measured engine speed data.

Another object of the present invention is to provide a look-up table which is accessible to the engine control microprocessors (ECM) of the engine to compensate for static errors in engine speed data measured over the operating speed range of the engine.

These and other objects and advantages of the invention herein will be set forth in the following description made in connection with the accompanying drawings in which like reference characters refer to similar parts throughout the several views.

DESCRIPTION OF THE PREFERRED EMBODIMENTS

Figure 1:
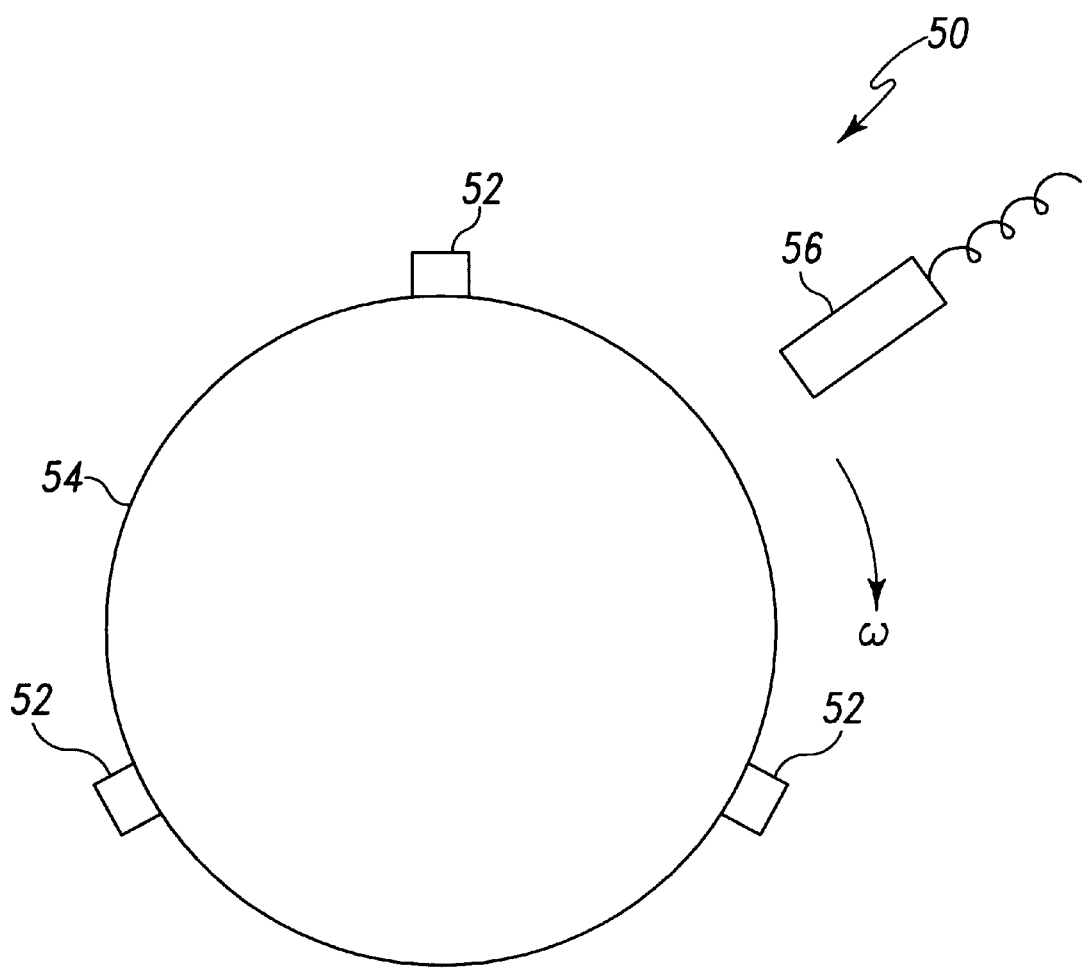
FIG. 1 is a schematic diagram of a prior art engine speed sensor.

For the purposes of promoting an understanding of the principles of the invention, reference will now be made to the embodiments illustrated in the drawings and specific language will be used to describe the same. It will nevertheless be understood that no limitation of the scope of the invention is thereby intended, such as alterations and further modifications in the illustrated device, and such further applications of the principles of the invention as illustrated therein being contemplated as would normally occur to one skilled in the art to which the invention relates are to be included.

The methodology of the present invention requires measuring engine speed variations by measuring small angular rotation intervals of an engine cycle and for multiple cycles.

FIG. 1 illustrates a typical prior art engine speed sensor, indicated generally as 50. Ferrous targets or teeth, 52 are placed at fixed angular positions upon a rotating shaft 54, such as a crankshaft or camshaft, which rotates at a fixed speed relative to the engine speed. An appropriate sensor 56, such as a Hall effect sensor, a reluctance or optical sensor, is placed so as to sense the passing of each of the teeth 52 and to generate an output signal in response thereto. This output signal is generally applied as an interrupt to a microprocessor such that the microprocessor (not shown) can measure the time delay between successive outputs from the sensor 56 (and therefore also successive passing of the targets 52). Those having ordinary skill in the art will recognize that the engine speed sensor 50 is illustrated by way of example only, and that there are many different known methods for measuring engine speed.

Figure 2:
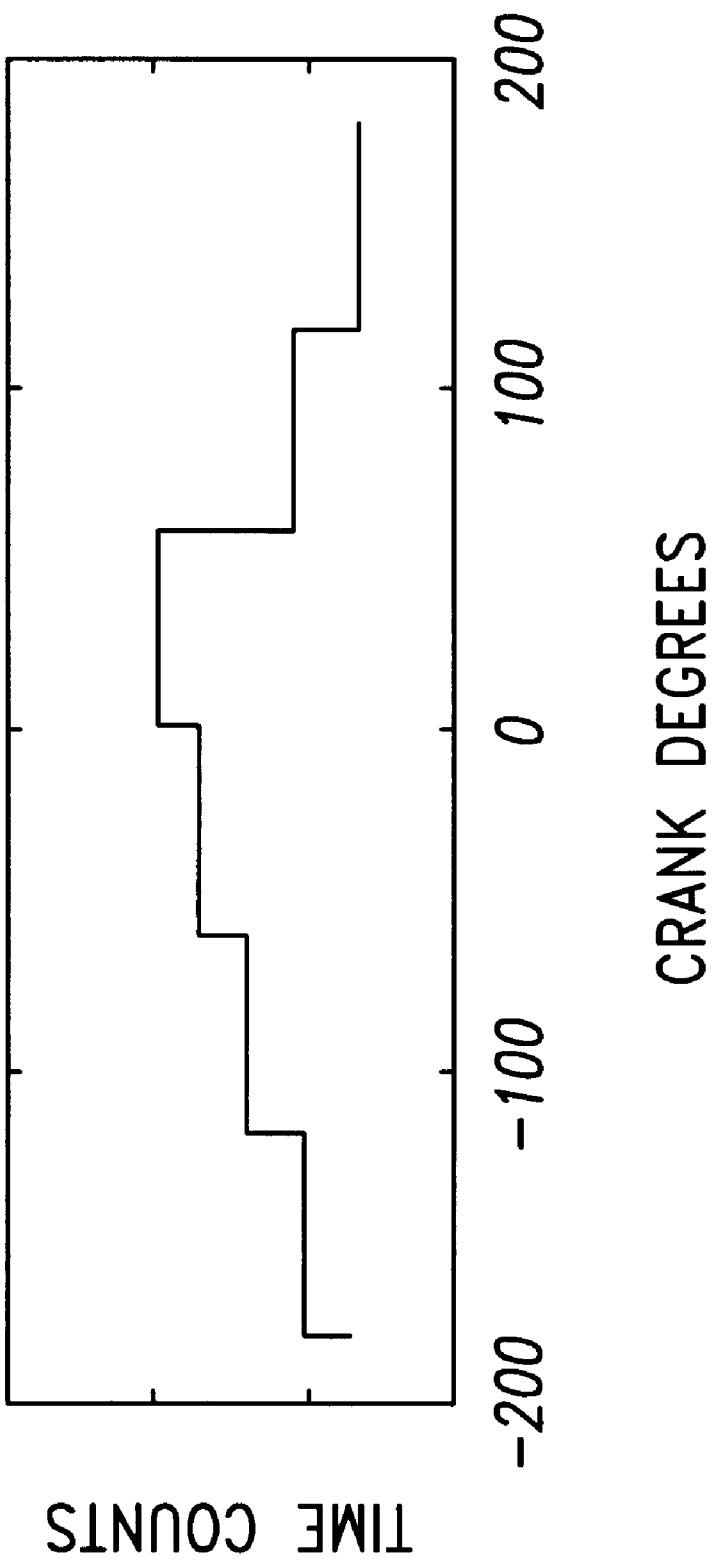
FIG. 2 is a graph of timer counts versus crankshaft degrees for the speed sensor illustrated in FIG. 1.

In the embodiments of the present invention, engine speed is measured at any convenient location where appropriate instrumentation is allowed, such as the crankshaft, camshaft, etc. The engine speed sensing instrumentation uses an engine speed sensor (ESS) or an engine position sensor (EPS) to generate pulse signals as gear teeth or targets pass by. The output of the sensor 56 is coupled to an interrupt input port of the engine control module (ECM) microprocessor (not shown). Those having ordinary skill in the art will appreciate that nearly all modern engines incorporate a microprocessor-based engine control module in order to manage various engine functions. Preferably, the process of the present invention is to be implemented as software code stored in a memory associated with the engine control module (ECM) microprocessor of the engine, the software code being executed by the microprocessor as described herein. Such implementation has the advantage that the static errors can be recomputed periodically as the engine ages and the correction table can then be updated. However, other speed sensing and computation devices external to the engine may be used to implement the present invention. Therefore, each time one of the targets 52, passes the sensor 56, an interrupt signal is generated and sent to the ECM microprocessor. The microprocessor operates a timer which measures the time between the passing of successive targets 52 past the sensor 56. FIG. 2 illustrates a graph of these timer counts versus crank degrees for one complete engine cycle. It can be appreciated that if the pitch varies between adjacent teeth, a different number of timer counts is accumulated between each of the successive activations of the sensor 56. The timer counts in FIG. 2 are converted to the measured engine speed assuming a theoretical fixed distance (pitch) between teeth 52. The measured engine speed could contain static errors for which a correction look-up table, an embodiment of the present invention, is designed to compensate.

To construct the look-up table, it is preferred that the engine be at motoring deceleration without combustion and load. In such an engine condition, engine speed fluctuations due to imbalanced cylinder power are removed, and those due to torsional vibrations are reduced. It is also preferred that the average engine speed is in the range of approximately 600 to 700 rpm. The average speed at which the engine speed data is taken (or correction table is established) is referred to as reference engine speed $y_{(ref)}$.

Figure 3:
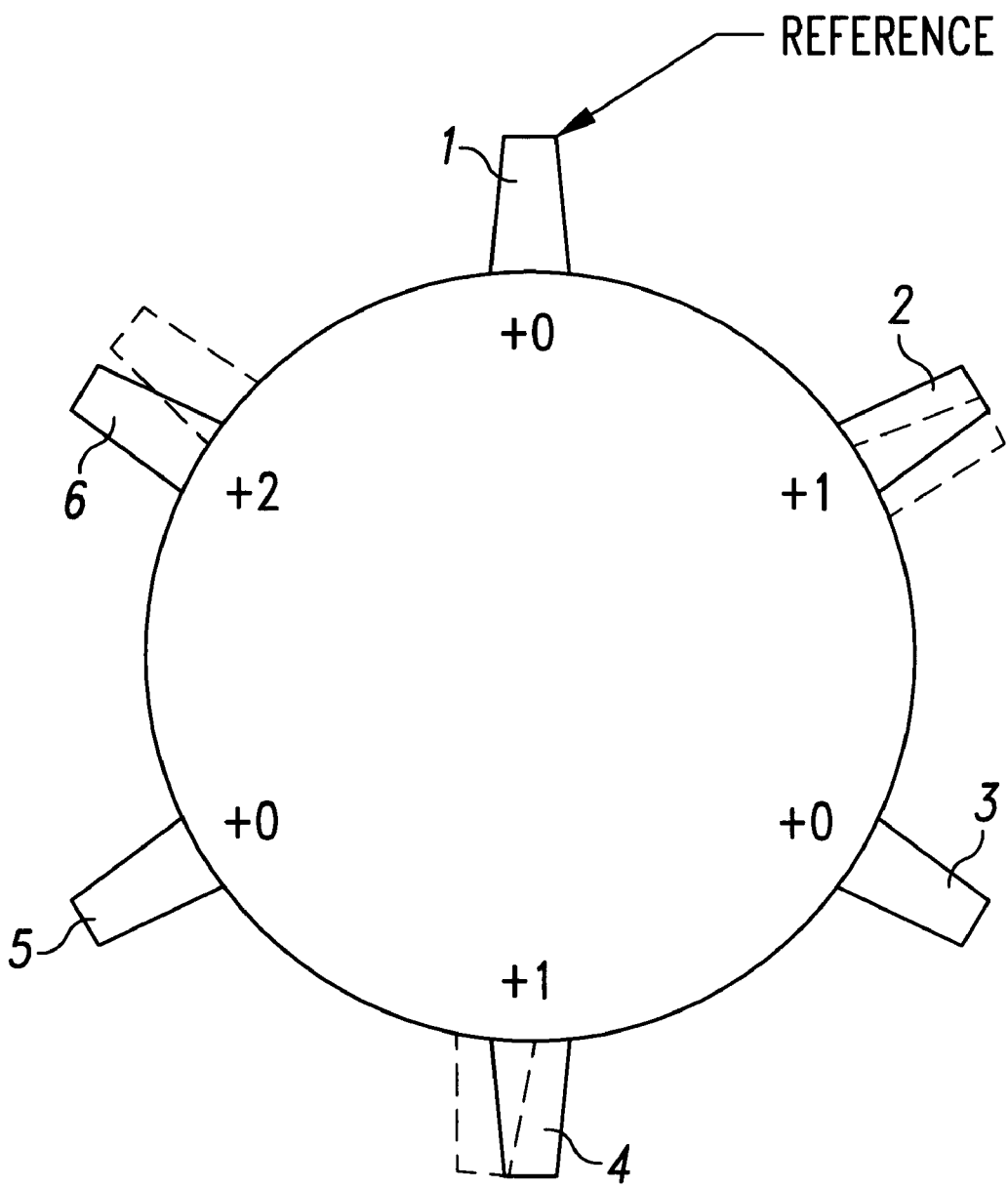
FIG. 3 is a schematic diagram illustrating a six tooth cam gear having tooth-to-tooth spacing errors.

A static error, which is caused by tooth-to-tooth spacing error in the cam gear where the engine speed is measured, is used to illustrate the derivation of the mathematical algorithm of the present invention. FIG. 3 shows a six-tooth cam gear having spacing errors between the teeth 1–6. The dashed lines indicate dislocated teeth with index variation +0 for the reference tooth 1, then +1 for tooth 2 and +0, +1 +0, +2 for the rest of the teeth, respectively. Thus the pitch (p) variations between sets of adjacent teeth are:

$p_{12} = +1 - 0 = 1,$   $p_{23} = +0 - 1 = -1,$   $p_{34} = +1 - 0 = 1,$
$p_{45} = +0 - 1 = -1,$   $p_{56} = +2 - 0 = 2,$   $p_{61} = +0 - 2 = -2.$

The net sum of the pitch variations over one engine cycle is zero, that is:

$\Sigma p_{12} + p_{23} + p_{34} + p_{45} + p_{56} + p_{61} = 0$

At constant engine speed, at any given instant, the 'compensated' or theoretical engine speed is the 'measured' engine speed after correction for the pitch variation errors, such that $$\omega \approx \omega_0 + \alpha(\Delta\theta - \Delta\theta_0)$$

where $\omega$ is the measured engine speed, $\omega_0$ is the compensated engine speed, $\Delta\theta$ is the actual angular distance containing tooth-to-tooth spacing errors, $\Delta\theta_0$ is the theoretical angular distance between the two adjacent teeth, and $\alpha$ is a constant depending on $\omega_0$ and $\Delta\theta 0$.

It is to be understood that similar to the pitch variations, the sum of the static errors, in measured speed in one engine cycle produced by other causes is also approximately equal to zero.

Figure 4:
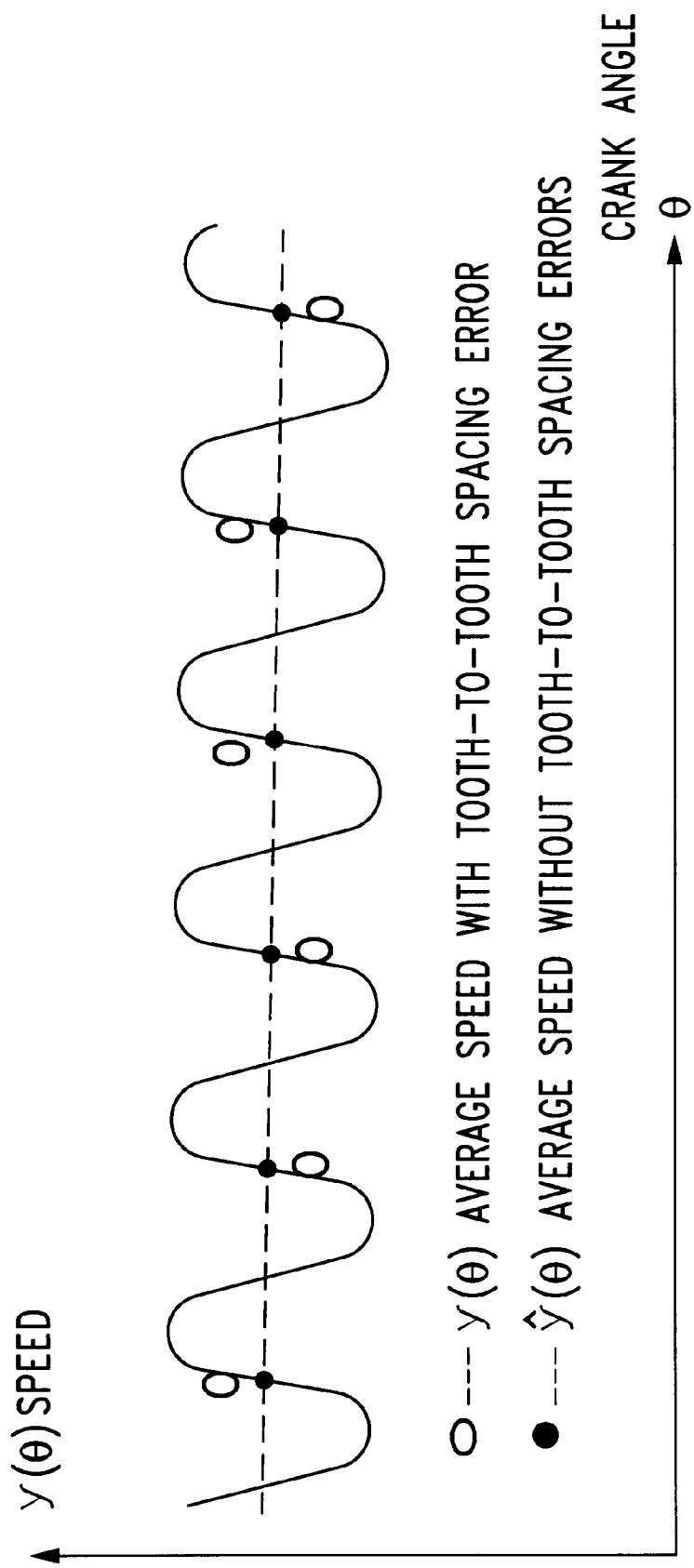
FIG. 4 is a graph of engine speed versus crankshaft degrees over one engine cycle for a six-cylinder engine.

In a multiple-cylinder reciprocating internal combustion engine, the instantaneous speed of the engine over an engine cycle is not constant. FIG. 4 illustrates a graph of engine speed, $y(\theta)$ (in revolutions per minute), versus crankshaft position, $\theta$ (in degrees), for a six-cylinder engine. The instantaneous engine speed, $y\theta$, is quasi-periodic with each cylinder firing as one period. Without static errors, the theoretical average speed, $\hat{y}(\theta)$, over each 60° of camshaft angle (integrating over the acceleration and deceleration of the engine during the firing of a cylinder) form a straight line during the motoring deceleration, as illustrated by the dashed line and filled circles. It can be seen that the instantaneous speed of the engine (the open circles) varies significantly from its average speed as each of the engine cylinders fires in turn (the peaks of the graph represent successive firings of the engine cylinders). Due to the tooth-to-tooth spacing errors, the measured engine speed will deviate from this theoretical average speed line as illustrated by the open circles.

When N number of engine speed data $(\theta_1, y_1; \theta_2, y_2; \ldots \theta_N, Y_N)$ are taken in one engine cycle, the theoretical engine speed is defined by the dashed line $\hat{y} = a + b\theta$. Thus, corresponding to each $\theta_i$, the theoretical engine speed can be estimated by $\hat{y}_i = a + b\theta_i$. The static errors or residual, r(i), is estimated from the difference between the measured speed $y_i$ and the theoretical average speed $\hat{y}_i$, such that:

$$r(i) = y_i - \hat{y}_i,$$

and $$r(i) = y_i - a - b\theta_i$$

Since the sum of the static errors in one engine cycle theoretically equals zero, we have:

$$\sum_{i=1}^{N} r(i) = \sum_{i=1}^{N} (y_i - a - b\theta_i) = 0.$$

To reduce the effects of noise, the measured engine speed is averaged. Dividing both sides of the equation by N yields:

$$\bar{y} - a - b\bar{\theta} = 0,$$

and $$\bar{y} = a + b\bar{\theta}$$

where $$\bar{y} = \frac{1}{N}\sum_{i=1}^{N} y_i, \quad \bar{\theta} = \frac{1}{N}\sum_{i=1}^{N} \theta_i.$$

When decelerating speed data are collected over M engine cycles, where M≧2, or ≧720 degrees of rotation of a camshaft of the engine, M number of equations of the average measured speed of the individual engine cycles and their cost functional J are established as follows:

$$\bar{y}_j - a - b\bar{\theta} = \epsilon_j,$$

j=1,2, ... M and $$J = \sum_{j=1}^{M} \varepsilon_j^2.$$

Since the sum of the static errors in one engine cycle is zero, the solution to the values of a and b which minimize the cost functional J determines the average measured speed line. The least-square solution to the values of a and b such that J is minimized is:

$$\begin{bmatrix} a \\ b \end{bmatrix} = (\Phi^t \Phi)^{-1} \Phi^t Y,$$

where $$Y = \begin{bmatrix} \bar{y}_1 \\ \bar{y}_2 \\ \vdots \\ \bar{y}_M \end{bmatrix}, \quad \Phi = \begin{bmatrix} 1 & \bar{\Phi}_1 \\ 1 & \bar{\Phi}_2 \\ \vdots & \vdots \\ 1 & \bar{\Phi}_M \end{bmatrix}$$

The static errors, or residual r(i), at each speed measurement point is estimated by:

$$r(i) = y_i - a - b\theta_i$$

Additionally, to minimize the noise effect, the static errors at each speed measurement point taken from multiple engine cycles are averaged, where the mean residual $\bar{r}(i)$, is $$\bar{r}(i) = \frac{1}{M} \sum_{j=1}^{M} r(i + (j-1)N), \quad i = 1, \ldots N.$$

The compensated instantaneous engine speed is then computed from the measured engine speed by subtracting the mean residual value $\bar{r}(i)$ therefrom, that is:

$$\hat{y}_i = y_i - \bar{r}(i)$$

The measured engine speeds thus compensated for the static errors more accurately reflect the true engine speed.

The static errors are specific for each individual engine. To apply the correction discussed above, a table of the mean residual $\bar{r}(i)$ for each specific speed point is constructed for each engine. It is preferred that the table is stored as a look-up table in the memory associated with the ECM microprocessor and be implemented within the software code being executed by the ECM microprocessor.

The look-up table of mean residuals $\bar{r}(i)$ is used to compensate measured speed at different operating engine speeds. The residuals $r(i)_{(op)}$ at any other steady state engine speed $y_{(op)}$ can be calculated by:

$$(r(i))_{(op)} = \frac{y_{(op)}}{y_{(ref)}} \bar{r}(i), \quad i = 1, 2, \ldots N.$$

where

N is the number of measurement points in one engine cycle $y_{(ref)}$ is the engine speed at which the mean residuals table was established, and the 'theoretical' or compensated engine speed is calculated by:

$$\hat{y}_{i(op)} = y_{i(op)} - r(i)_{(op)},$$

i=1,2, . . . N.

Figure 5:
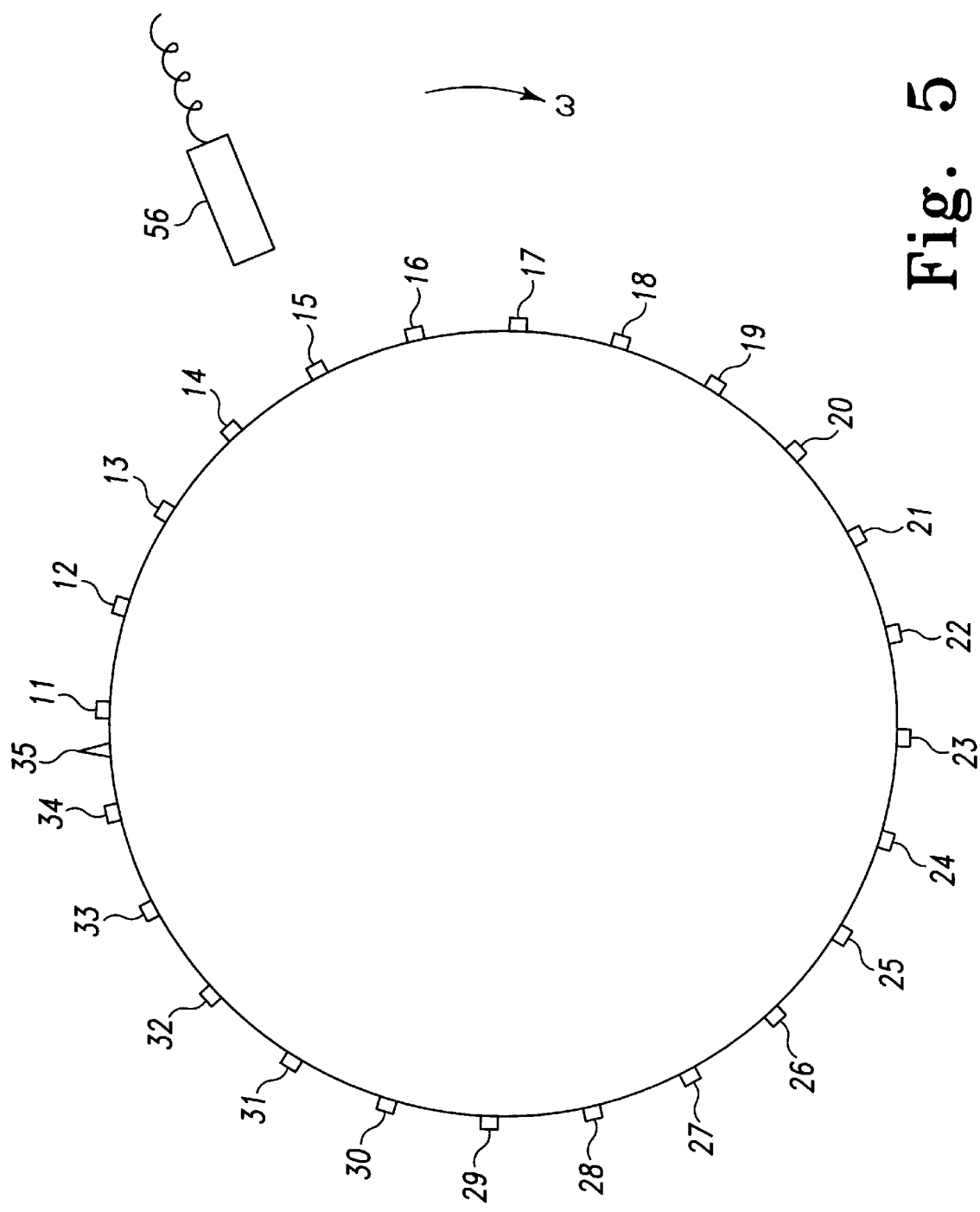
FIG. 5 is a schematic diagram illustrating a cam gear having 24 targets and a reference target where a sensor can detect an electronic pulse.
Figure 6:
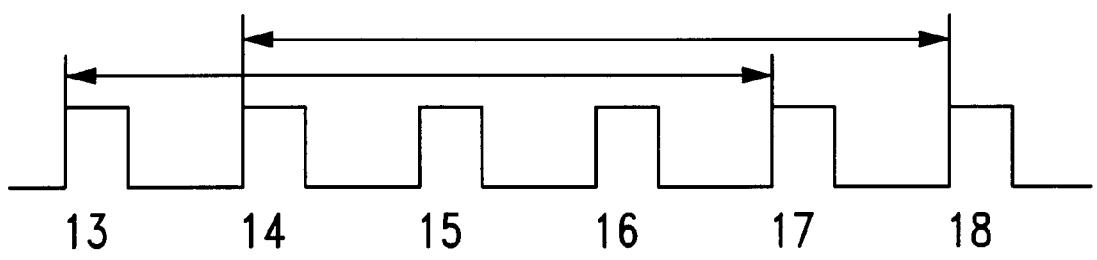
FIG. 6 is a schematic illustration of an engine speed measuring scheme for a six-cylinder engine.

In another embodiment of the present invention, the mean residuals $\bar{r}(i)$ are calculated for every target point by taking speed measurements of only one engine cycle. For example, the engine speed may be measured from a cam gear on which there are 24 and a (+1) targets, 11–34 and 35, respectively, as shown in FIG. 5. A target is each location where the sensor can detect an electronic pulse. The extra (+1) target 35, is a reference which assists the sensor to locate a complete revolution of the engine. Preferably, the (+1) reference location also indicates where the true top dead center of the first firing cylinder (TDC#1) lies. At each target location, a speed data point is taken as the average speed over the angular distance of four teeth. Referring to FIG. 6, in this example, at target 17, the speed measurement is taken as the average speed from targets 13 to 17. At target 18, the speed measurement is taken from targets 14 to 18. The 24 speed data points are grouped as follows:

| Cam Gear Target Number | | | | | | |
|---|---|---|---|---|---|---|
| Group 1 | 11 | 15 | 19 | 23 | 27 | 31 |
| Group 2 | 12 | 16 | 20 | 24 | 28 | 32 |
| Group 3 | 13 | 17 | 21 | 25 | 29 | 33 |
| Group 4 | 14 | 18 | 22 | 26 | 30 | 34 |

Since each speed data point group defines a pattern of six targets in one cam revolution, the algorithm can be applied to individual group to find the residuals for every target speed point. In this example, four separate regression equations containing six data point each can be established. The average measured speed is:

$$\bar{y} - a_k - b_k \bar{\theta} = 0, \quad k = 1, \ldots, 4.$$

where $$\bar{y} = \frac{1}{N} \sum_{i=1}^{N} y_i, \quad \bar{\theta} = \frac{1}{N} \sum_{i=1}^{N} \theta_i \quad i = 1, \ldots, N, \quad N = 6$$

When decelerating speed data are collected over M engine cycles, where M≧2, or ≧720 degrees of rotation of a camshaft of the engine, M number of equations of the average measured speed of the individual engine cycles and their cost functional J are established as follows:

$$\bar{y}_j - a_k - b_k \bar{\theta} = \varepsilon_j, \quad j = 1, 2, \ldots, M, \quad k = 1, \ldots, 4$$

and $$J = \sum_{j=1}^{M} \varepsilon_j^2.$$

Similarly, the sum of static errors in each speed data group is zero, and the solution to the values of a and b which minimize the cost functional J determines the average measured speed line. The static error in each target speed point within a group is estimated by:

$$r(i) = y_i - a_k - b_k \theta_i$$

and the mean residual (mean static error) $\bar{r}(i)$ for each target point averaged over the several spread data groups is:

$$\bar{r}(i) = \frac{1}{M} \sum_{j=1}^{M} r(i + (j-1)N), \quad i = 1, \ldots N, j = 1, \ldots M.$$

The compensated engine speed is then computed from the measured speed by subtracting the mean residual value $$\bar{r}(i),$$

that is:

$$\hat{y}_i = y_i - \bar{r}(i).$$

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for correcting static error in engine speed measurements, comprising the steps of:
    a) sensing a speed of said engine a plurality of times during a time period;
    b) performing a least square regression analysis upon said sensed engine speeds, thereby determining a theoretical engine speed line;
    c) subtracting said sensed engine speed from said theoretical speed to determine a residual at each speed measuring point;
    d) measuring an instantaneous engine speed; and,
    e) subtracting said residual from said instantaneous measured engine speed, thereby resulting in a compensated engine speed which is a closer estimate of the theoretical speed of said engine.

2. The method of claim 1, further comprising the step of decelerating said engine such that said engine is motoring without combustion or load to within a reference speed range.

3. The method of claim 2, wherein said reference speed range is between 600 to 700 rpm.

4. The method of claim 3, wherein said time period at step (a) is at least two engine cycles.

5. The method of claim 4, wherein step (a) further comprises averaging said sensed engine speeds.

6. The method of claim 5, further comprising the step of determining a mean residual for each speed measuring point.

7. The method of claim 6, wherein said residual being subtracted at step (e) is said mean residual.

8. The method of claim 6, further comprising computing a residual for any other steady state engine speed based on said mean residual determined at said reference engine speed.

9. The method of claim 6, further comprising storing said mean residuals as a look up table.

10. The method of claim 9, further comprising storing said look-up table in memory associated with an engine control module microprocessor of said engine.

11. The method of claim 10, further comprising implementing said look-up table within software codes being executed by said engine control module microprocessor.

12. The method of claim 1, wherein step (a) further comprises sensing said engine speed at a cam gear location, wherein said cam gear rotates at a fixed relative speed with the rotation of the crankshaft of said engine.

13. The method of claim 12, further comprising sensing said engine speed using an engine speed sensor (ESS) to generate pulse signals as targets pass by a fixed point.

14. The method of claim 12, further comprising sensing the engine speed using an engine position sensor (EPS) to generate pulse signals as targets pass by a fixed point.

15. A method for compensating measured engine speeds for non-fuel induced imbalances in a multi-cylinder reciprocating internal combustion engine, comprising:
   a) sensing signals as targets pass by for a time period;
   b) measuring a speed at a plurality of speed points, wherein said speed points each span a plurality of consecutive targets;
   c) grouping said speed points, wherein each group defines a pattern of targets in one crankshaft revolution;
   d) averaging said measured speed, for each said speed points, over all speed point groups;
   e) performing a least squares regression analysis upon said average measured speed, thereby determining a theoretical engine speed line;
   f) determining a residual at each speed measuring point; and,
   g) measuring an instantaneous engine speed; and,
   h) subtracting said residual from said instantaneous engine speed, thereby resulting in a compensated engine speed which is a closer estimate of a true speed of said engine.

16. The method of claim 15, further comprising the step of decelerating the engine to a reference speed range, such that said engine is motoring without combustion or load.

17. The method of claim 16, wherein said reference speed range is between 600 to 700 rpm.

18. The method of claim 16, wherein said time period at step (a) is one engine cycle.

19. The method of claim 18, further comprising computing a residual for any other steady state engine speed based on said mean residual determined at said reference engine speed.

20. The method of claim 19, further comprising the step of determining a mean residual for each speed measuring point; and wherein said residual being subtracted in step (h) is said mean residual.

21. The method of claim 20, further comprising storing said mean residuals as a look-up table in memory associated with an engine control module microprocessor of said engine, and implementing said look-up table within software codes being executed by said engine control module microprocessor.

22. The method of claim 15, wherein step (a) further comprises sensing the engine speed at a cam gear, said cam gear rotates at a fixed relative speed with the rotation of the crankshaft of said engine and wherein said cam gear includes a reference target which assists a sensor to locate a complete revolution of said engine.

23. A system for compensating measured engine speeds for non-fuel induced imbalances in a multi-cylinder reciprocating internal combustion engine, comprising:
   means for sensing a speed of said engine a plurality of times during a time period;
   means for performing a least squares regression analysis upon said sensed engine speeds, thereby determining a theoretical engine speed line;
   means for determining a residual at each speed measuring point;
   means for measuring an instantaneous engine speed; and,
   means for subtracting said residual from said measured instantaneous engine speed, thereby resulting in a compensated engine speed which is a closer estimate of said theoretical speed of said engine.

24. The system of claim 23, further comprising means for decelerating said engine such that said engine is motoring without combustion or load to a reference speed range.

25. The system of claim 24, wherein said reference speed range is between 600 to 700 rpm.

26. The system of claim 24, wherein said means for sensing said speed comprises means for sensing said speed for at least two engine cycle.

27. The system of claim 26, further comprising means for averaging said sensed engine speed before performing said least regression analysis, thereby reducing noise effects.

28. The system of claim 27, further comprising means for determining a mean residual for each speed measuring point.

29. The system of claim 28, further comprising means for subtracting said mean residual from said instantaneous measured engine speed, thereby resulting in a compensated engine speed which is a closer estimate of said theoretical speed of said engine.

30. The system of claim 29, further comprising means for storing said mean residual as a look-up table and means for implementing said look-up table.

31. The system of claim 30, wherein said means for storing said look-up table is memory-associated with an engine control module microprocessor, and means for implementing said look-up table is software codes being executed by said engine control module microprocessor.

32. The system of claim 23, wherein means for sensing a speed further comprises means to sense the engine speed at a cam gear location, wherein said cam gear rotates at a fixed relative speed with the rotation of the crankshaft of said engine.

33. The system of claim 23, wherein said means for sensing said engine speed is an engine speed sensor (ESS) which generates pulse signals as gear teeth or targets pass by.

34. The system of claim 23, wherein said means for sensing said engine speed is an engine position sensor (EPS) which generates pulse signals as gear teeth or targets pass by.

35. The system of claim 28, wherein said means for determining said mean residuals further comprises means for computing a residual for any other steady state engine speed based on said mean residual determined at said reference engine speed.

36. A system for compensating measured engine speeds for static errors comprising:
   means for sensing a target during a rotation of the crankshaft;

means for computing a measured engine speeds at a plurality of speed points;

means for performing a linear regression upon said measured engine speeds, thereby producing a mathematical representation of an average speed of said engine regardless of the firing of said at least one cylinder;

means for computing a residual;

means to measure an instantaneous engine speed; and means to calculate compensated measured speeds using said residuals, such that said compensated measured speeds better approximate a true speed of said engine.

37. The system of claim 36, further comprising means for grouping a plurality of speed points into speed point groups.

38. The system of claim 37, further comprising means for computing a mean residual for each of said speed points.

39. The system of claim 38, further comprising means for storing said mean residuals in the form of a look-up table accessible to an engine control system of said engine.

40. The system of claim 39, wherein the means for computing further includes means for computing operating speed residuals for other steady state engine speeds based on mean residuals determined at a reference engine speed.

41. The system of claim 40, wherein said reference speed range is between 600 to 700 rpm.

* * * * *